United States Patent
Lee et al.

(10) Patent No.: US 11,521,523 B1
(45) Date of Patent: Dec. 6, 2022

(54) CURVED DISPLAY PANELS

(71) Applicant: HEWLETT-PACKARD DEVELOPMENT COMPANY, L.P., Spring, TX (US)

(72) Inventors: Chien-Kuo Lee, Taipei (TW); Hogan Hote Yeh, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/350,924

(22) Filed: Jun. 17, 2021

(51) Int. Cl.
  *G09F 9/30* (2006.01)
  *G06F 1/18* (2006.01)

(52) U.S. Cl.
  CPC .............. *G09F 9/301* (2013.01); *G06F 1/181* (2013.01)

(58) Field of Classification Search
  CPC ................................ G09F 9/301; G06F 1/181
  See application file for complete search history.

(56) References Cited

U.S. PATENT DOCUMENTS

| 9,348,362 | B2 | 5/2016 | Ko et al. | |
| 9,535,452 | B2 | 1/2017 | Ahn | |
| 9,608,231 | B2 * | 3/2017 | Lee | H05K 5/03 |
| 2012/0281367 | A1 * | 11/2012 | He | G09F 9/301 |
| | | | | 361/728 |
| 2017/0013728 | A1 * | 1/2017 | Lee | G02F 1/1333 |
| 2017/0018250 | A1 | 1/2017 | Shai | |
| 2017/0177035 | A1 | 6/2017 | Song | |
| 2018/0267571 | A1 | 9/2018 | Chen | |

* cited by examiner

*Primary Examiner* — James Wu
*Assistant Examiner* — Hung Q Dang
(74) *Attorney, Agent, or Firm* — Conley Rose P.C.

(57) ABSTRACT

An example electronic device includes a housing. In addition, the electronic device includes a display panel supported by the housing. The display panel includes a planar portion and a side portion extending from the planar portion to an end of the display panel. The planar portion and the side portion are to display images. The side portion is to transition between a first position in which the side portion is co-planar with the planar portion and a second position in which the side portion is curved relative to the planar portion.

11 Claims, 6 Drawing Sheets

CURVED DISPLAY PANELS

BACKGROUND

An electronic device may include a display panel to display images (e.g., text, pictures, video, graphics) during use. In addition, an electronic device may be a mobile device that is transported from place to place.

BRIEF DESCRIPTION OF THE DRAWINGS

Various examples will be described below referring to the following figures.

DETAILED DESCRIPTION

An electronic device may be a mobile device that is transported from place to place, and may include a display panel for displaying images. A display panel of an electronic device may be curved (e.g., concavely curved) such that a user may view all portions of the display panel with less (or no) eye strain. However, a curved display panel may limit the degree to which the electronic device may be folded or otherwise reduced in size for transportation or storage (e.g., in a bag, case, box, package).

Accordingly, the examples disclosed herein include electronic devices having a display panel that may be selectively transitioned between a flat position and a curved position. When the display panel is in the flat position, the electronic device may be more easily folded and/or stowed for transportation or storage. However, when the display panel is in the curved position, a user may more easily view the images displayed thereby with a reduced amount of eye strain. Thus, through use of the examples disclosed herein, a user may obtain the visual benefits of a curved display panel while ensuring the collapsibility and transportability of the electronic device.

Figure 1:
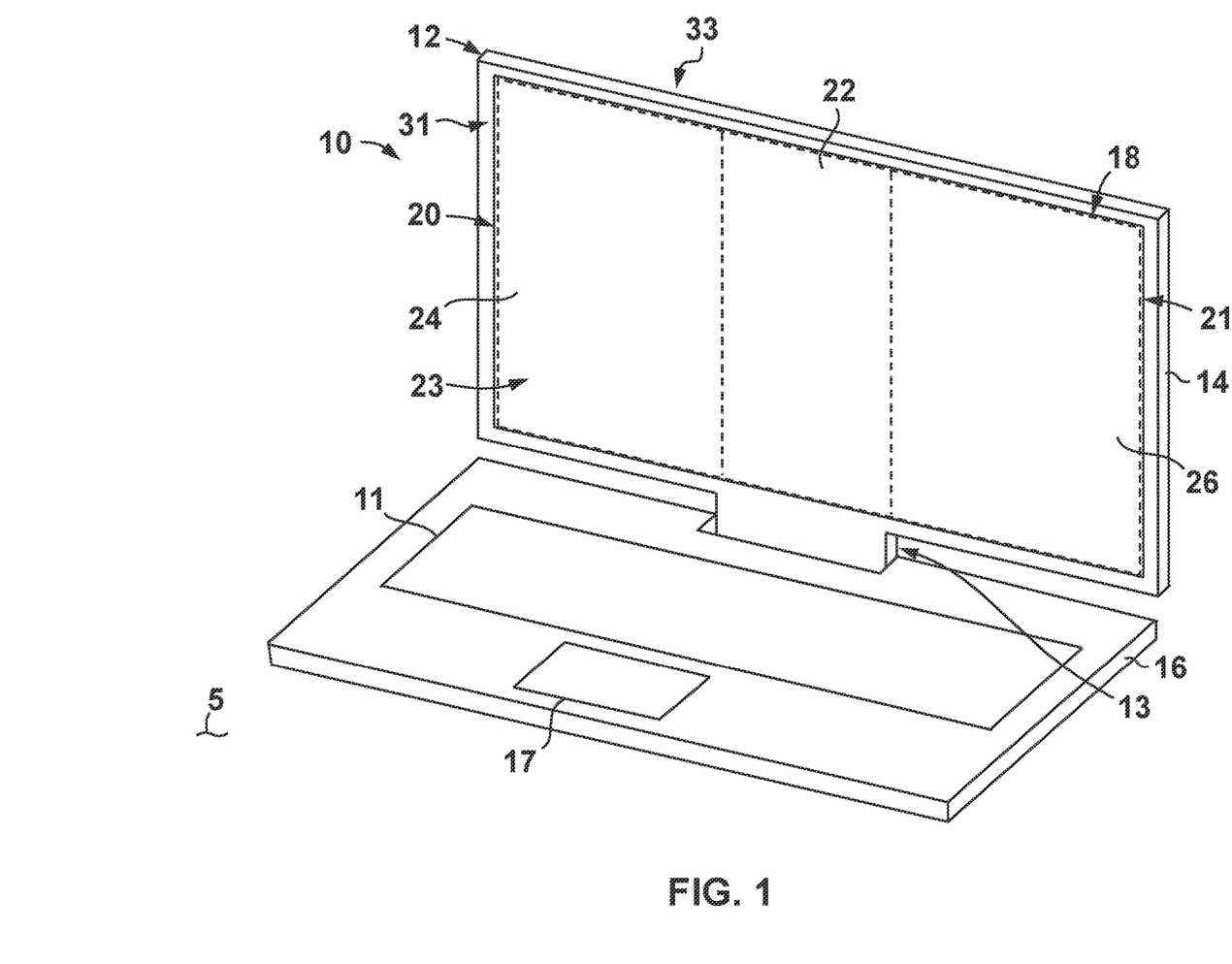
FIGS. 1 and 2 are perspective views of an electronic device having a display panel in a flat position and a curved position according to some examples.
Figure 2:
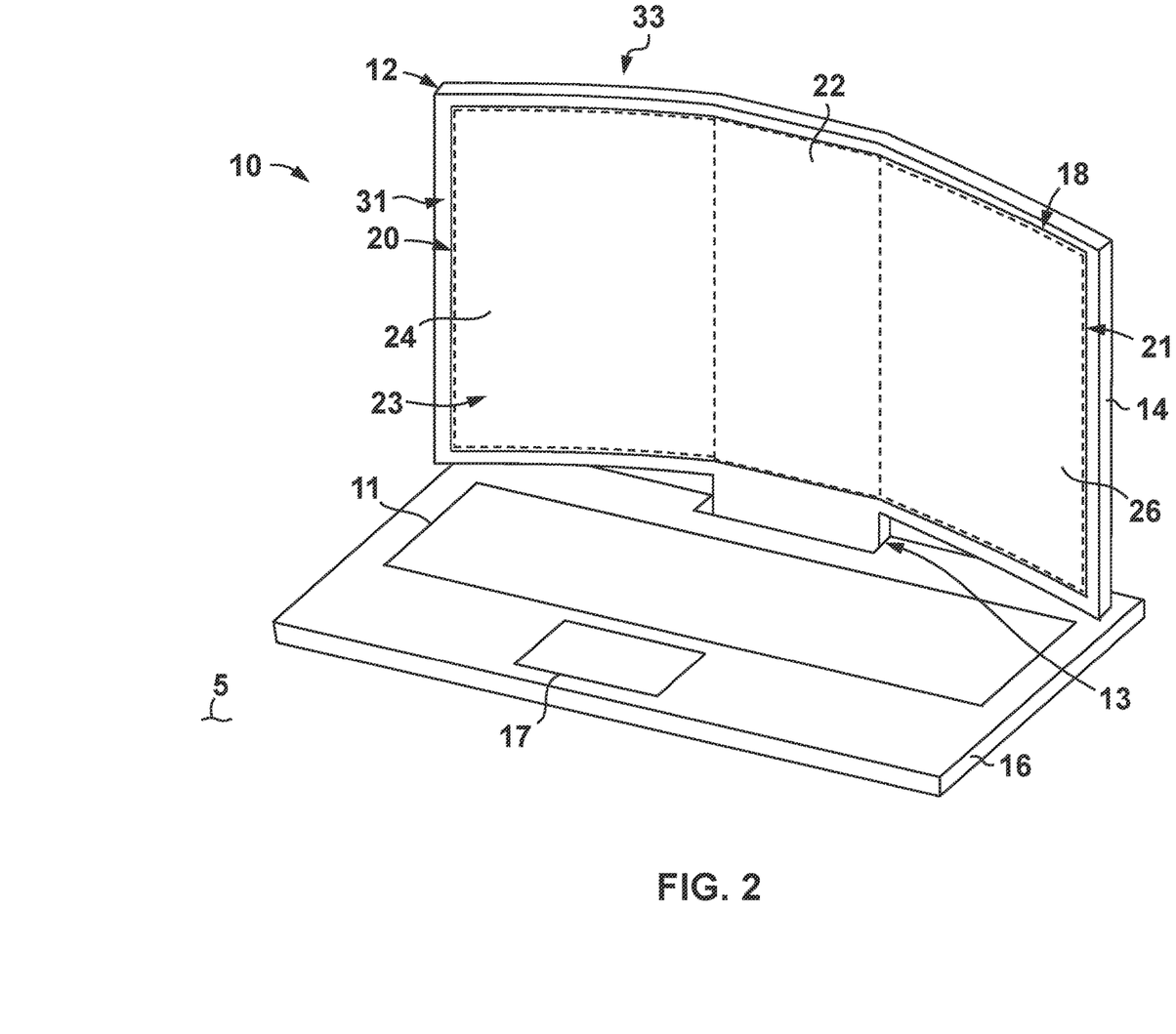

Referring now to FIGS. 1 and 2, an electronic device 10 having a display panel 18 that may be transitioned between a first or flat position (FIG. 1) and a second or curved position (FIG. 2) according to some examples is shown. As used herein, the term "electronic device," refers to a device that is to carry out machine-readable instructions, and may include internal components, such as, processors, power sources, memory devices, etc. For example, an electronic device may include, among other things, a tablet computer, a laptop computer, a desktop computer, an all-in-one computer, a smartphone, etc. In some examples, the electronic device 10 comprises a laptop computer including a clamshell style housing 12. In particular, housing 12 includes a first housing member 14, and a second housing member 16 coupled to one another via a hinge 13. Thus, during operations, the first housing member 14 may pivot about hinge 13 relative to second housing member 16. The first housing member 14 and the second housing member 16 may each be referred to herein as a "housing." Accordingly, the first housing member 14 may be referred to as a housing 14, and the second housing member 16 may be referred to as a housing 16.

The second housing member 16 supports a plurality of user input devices. For instance, in some examples, the second housing member 16 supports a keyboard 11 (e.g., physical keyboard, digital keyboard) and a touch sensitive surface 17 (e.g., a trackpad). During operations, the second housing member 16 may engage with a support surface 5 (e.g., a table, desk, counter-top, floor), such that housing 12 is generally supported on the support surface 5 by second housing member 16.

First housing member 14 supports display panel 18. The display panel 18 may display images during operations. Display panel 18 may utilize any suitable technique or technology for displaying images. For instance, display panel 18 may comprise a light emitting diode (LED) display, such as a micro-LED display or an organic LED (OLED) display. In some examples, display panel 18 may comprise a liquid crystal display (LCD), such as an organic LCD, or an electrophoretic display. In addition, display panel 18 may comprise a flexible display panel. As used herein, the term "flexible display panel" refers to a display panel that may be deformed (e.g., rolled, folded, etc.) within a given parameter or specification (e.g., a minimum radius of curvature) without losing electrical function or connectivity.

Referring still to FIGS. 1 and 2, first housing member 14 includes a first or front side 31 and a second or back side 33 opposite front side 31. During operations, the housing 12 may be in an open position (shown in FIGS. 1 and 2) in which the first housing member 14 is rotated away from the second housing member 16 so that an angle therebetween about the hinge 13 is greater than 0°.

Figure 3:
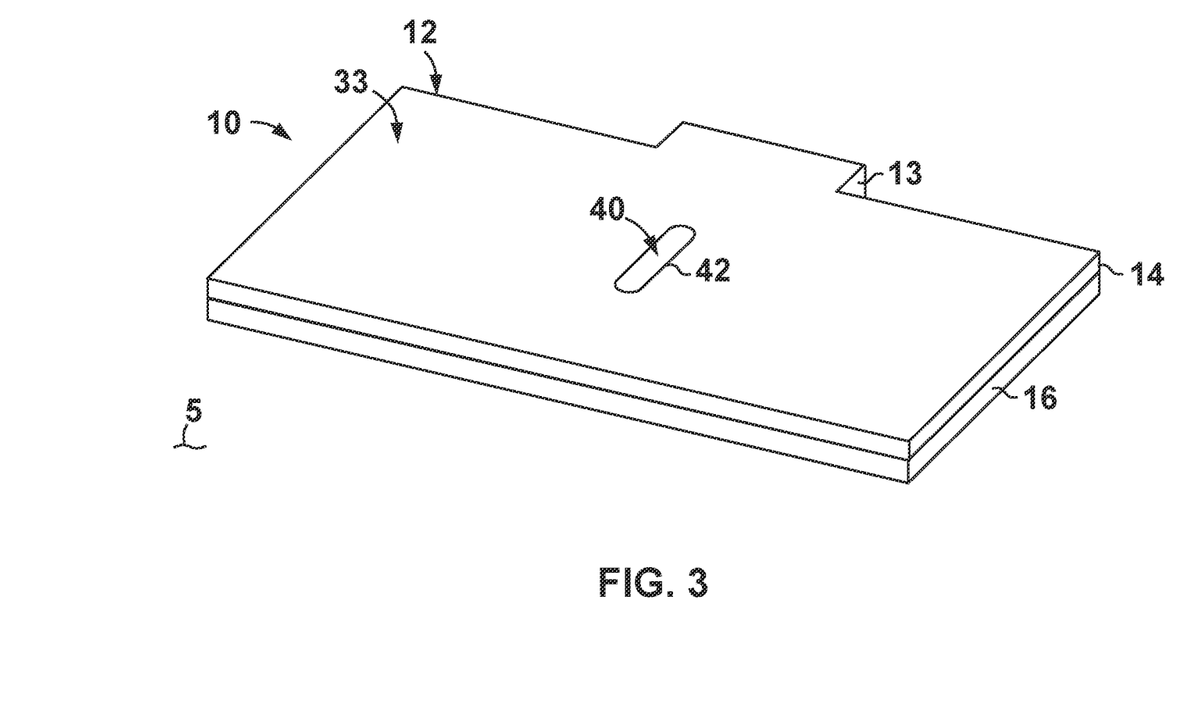
FIG. 3 is a perspective view of the electronic device of FIGS. 1 and 2, in a closed position according to some examples.

Referring now to FIG. 3, in some examples, the housing 12 may be transitioned to a closed position in which the first housing member 14 is rotated about hinge 13 to engage the front side 31 of first housing member 14 with second housing member 16. In this closed position, the front side 31 may be generally occluded by the second housing member 16.

Referring again to FIGS. 1 and 2, display panel 18 may comprise a pair of opposing ends 20, 21 and a display surface 23 visible on the front side 31 of first housing member 14 and extending between the ends 20, 21. The display surface 23 may comprise a central planar portion 22 (or more simply "planar portion 22") spaced between ends 20, 21, and a pair of side portions 24, 26 extending (e.g., extending continuously) from planar portion 22 to ends 20, 21, respectively. As best shown in FIG. 1, the display panel 18 may be transitioned to the flat position in which the pair of side portions 24, 26 are co-planar (e.g., aligned) with the planar portion 22. In addition, as best shown in FIG. 2, the display panel 18 may be transitioned to the curved position in which the pair of side portions 24, 26 are curved relative to planar portion 22. In particular, in the curved position of FIG. 2, the side portions 24, 26 are curved such that the ends 20, 21 are projected outward from planar portion 22 along front side 31 of first housing member 14. In addition, in the curved position, the side portions 24, 26 may be curved along a constant (or substantially constant) radius of curvature between planar portion 22 and ends 20, 21, respectively. As shown in FIGS. 1 and 2, in some examples, the planar portion 22 may remain flat (or planar) both when the display panel 18 is in the flat position (FIG. 1) and the curved position (FIG. 2).

During operations, a user may selectively transition the display panel 18 to the curved position of FIG. 2 to enhance a viewability of display panel 18 (e.g., to prevent or reduce eye strain). In addition, during operations a user may also transition the display panel 18 to the flat position of FIG. 1. For instance, a user may wish to transition the housing 12 to the closed position of FIG. 3. As a result, the user may first transition the display panel 18 to the flat position shown in FIG. 1 such that the first housing member 14 may lie flat along the second housing member 16 as depicted n FIG. 3.

Referring briefly again to FIG. 3, in some examples a slider 40 is coupled to housing 12 and is positioned along back side 33 of first housing member 14. A user may move the slider 40 along the back side 33 of first housing member 14 to transition the display panel 18 between the flat position (FIG. 1) and the curved position (FIG. 2). Thus, movement of the slider 40 along back side 33 of first housing member 14 may induce the concave curvature in the display panel 18 in the curved position of FIG. 2. Further details of the interaction of the slider 40 and display panel 18 in some examples are provided below.

Figure 4:
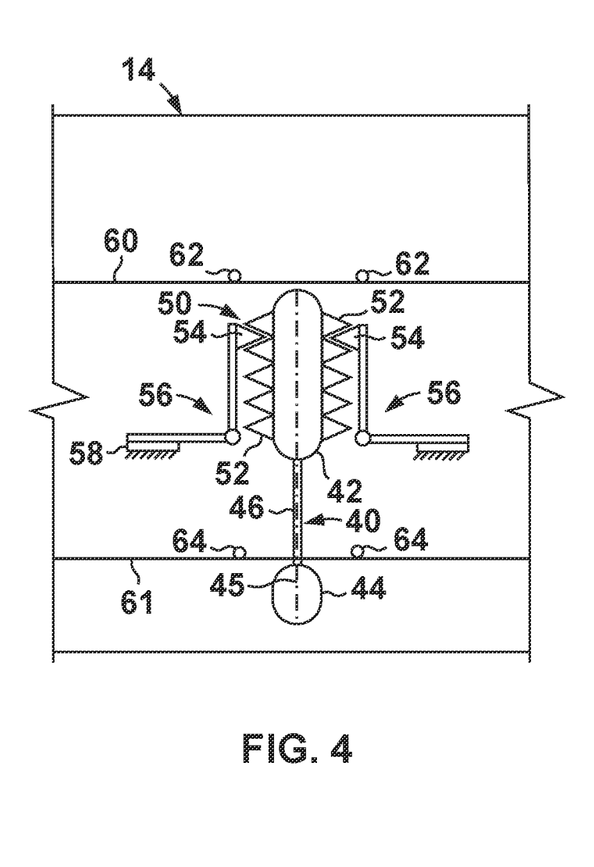
FIGS. 4 and 5 are rear views of a slider and locking mechanism within a housing member of the electronic device of FIGS. 1 and 2 according to some examples.
Figure 5:
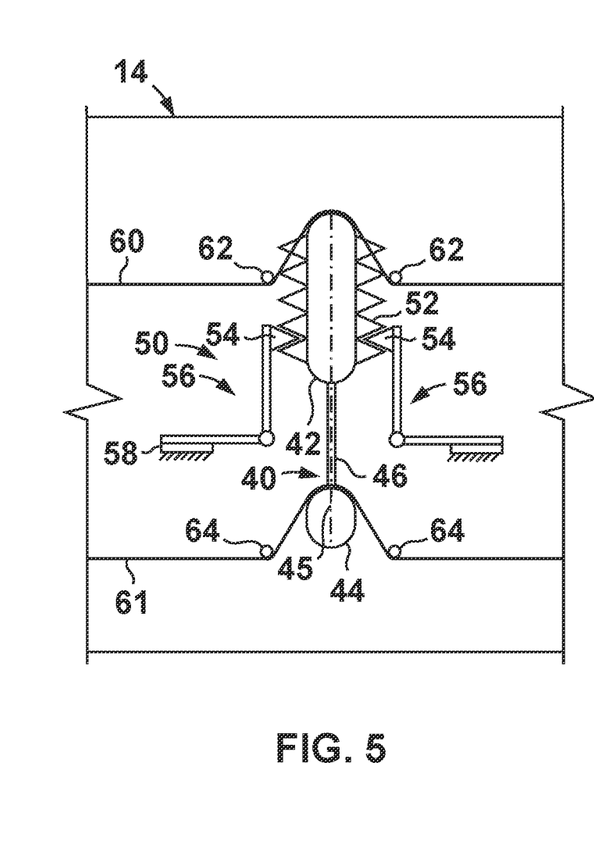

Referring now to FIGS. 4-7, slider 40 is movably positioned within first housing member 14 (NOTE: the outer surface of first housing member 14 that forms back side 33 is removed from view in FIGS. 4 and 5 to simplify the drawings and better show the features of slider 40). Slider 40 includes a longitudinal axis 45, a first body 42, a second body 44 axially spaced from first body 42, and an elongate connecting member 46 extending axially between first body 42 and second body 44. As is shown in FIG. 3, the first body 42 of slider 40 may be partially exposed along back side 33 of first housing member 14 so that a user may engage with the first body 42 of slider 40 during operations. The second body 44 may be positioned within and occluded by first housing member 14. During operations, slider 40 (e.g., including first body 42, second body 44, and connecting member 46) may move along axis 45 relative to first housing member 14 to transition display panel 18 (FIGS. 1 and 2) between the flat and curved positions as previously described.

Figure 6:
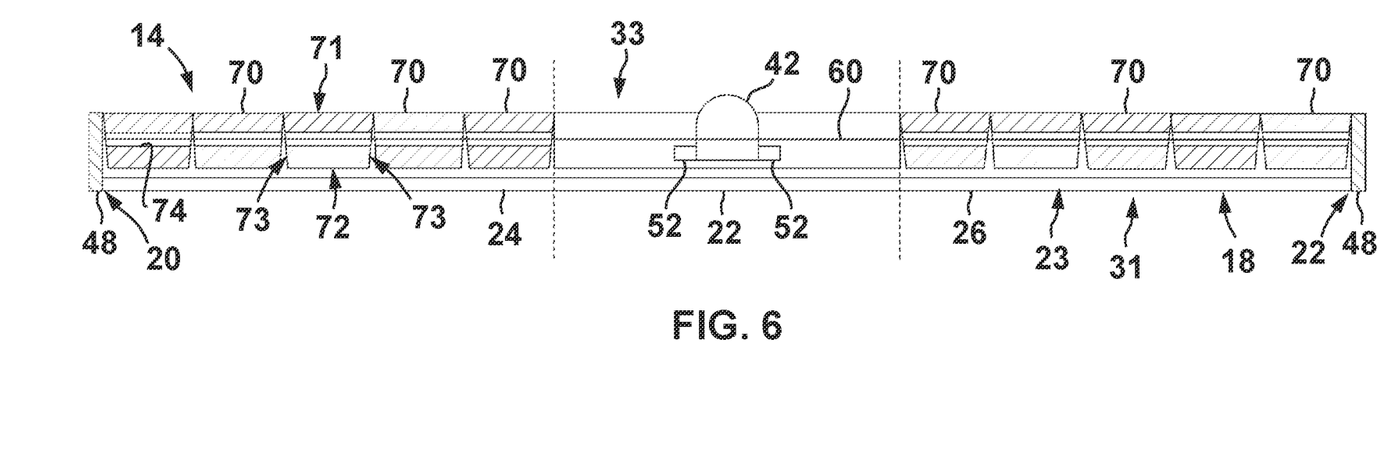
FIGS. 6 and 7 are top, partial cross-sectional views of a housing member and display panel of the electronic device of FIGS. 1 and 2 according to some examples.
Figure 7:
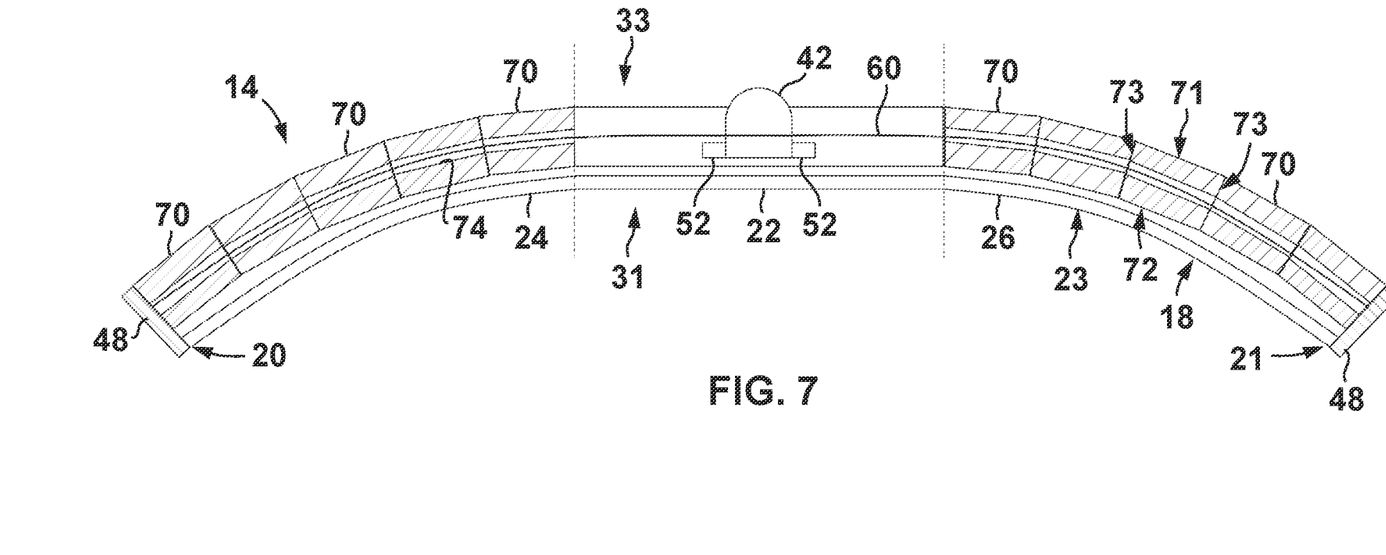

In particular, a pair of tensioners 60, 61 are positioned within first housing member 14 and are coupled to display panel 18. In particular, as best shown in FIGS. 6 and 7, the tensioners 60, 61 (note: tensioner 61 is not visible in the view of FIGS. 6 and 7) are coupled to the ends 20, 21 of display panel 18 via a chassis 48 or other structure of (or part thereof) of the first housing member 14. Thus, tension in the tensioners 60, 61 is transferred to the ends 20, 21 of display panel 18 via the chassis 48 during operations. In some examples, the tensioners 60, 61 comprise wires (e.g., metallic wires).

Referring now to FIG. 6, the first housing member 14 also comprises a plurality of blocks 70 positioned under (or aligned with) the side portions 24, 26 (FIGS. 1 and 2) of display panel 18. The blocks 70 may comprise a trapezoidal cross-section (e.g., an isosceles trapezoidal cross-section) and are arranged side-by-side along side portions 24, 26 of display panel 18. Due to the trapezoidal cross-sections of blocks 70, each block 70 may comprise a large side 71 and a small side 72 opposite large side 71. The sides 71, 72 may be connected by angled sidewalls 73 that generally taper inward from large side 71 toward small side 72. The large side 71 of each block 70 may face toward back side 33 of first housing member 14. In some examples, the large sides 71 of blocks 70 may form a portion of back side 33. Small sides 72 may face toward front side 31 of first housing member 14 and may be layered beneath display panel 18.

Figure 8:
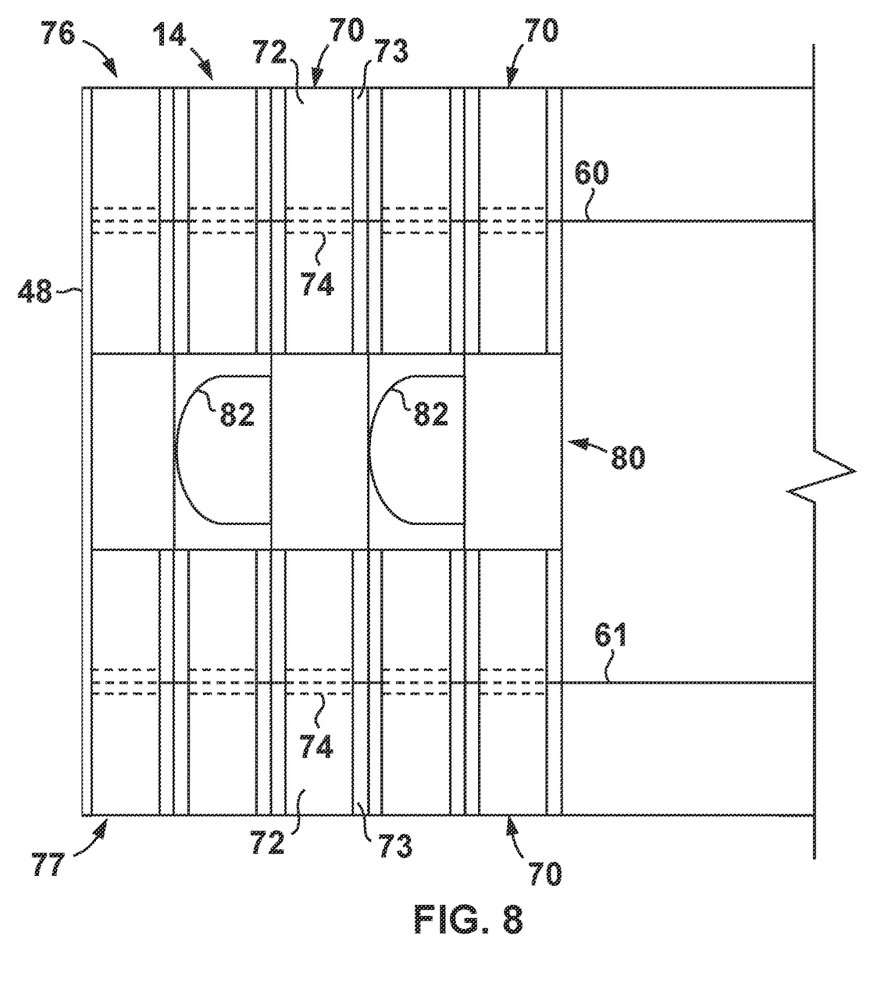
FIG. 8 is a back, schematic view of a portion of a housing of the electronic device of FIGS. 1 and 2 underling the side portion of the display panel according to some examples.

Each block 70 includes a channel 74 that receive the tensioners 60, 61 therethrough. Referring briefly to FIG. 8, a pair of rows 76, 77 of blocks 70 may be positioned under the side portions 24, 26 of display panel 18 (FIGS. 1 and 2), with a first row 76 receiving the first tensioner 60 through the aligned channels 74 of blocks 70 therein and a second row 77 receiving the second tensioner 61 through the aligned channels 74 of the blocks 70 therein. While FIG. 8 depicts the rows 76, 77 of blocks 70 under the side portion 24 of display panel 18, additional rows 76, 77 of blocks 70 are also positioned under the side portion 26 that are arranged as described herein.

Referring again to FIGS. 4-7, during operations, a user may move the slider 40 axially along back side 33 of first housing member 14 with respect to axis 45 so that first body 42 engages with first tensioner 60 and second body 44 engages with second tensioner 61. The engagement between bodies 42, 44 and tensioners 60, 61 may increase a tension within the tensioners 60, 61 which is then transferred to ends 20, 21 of display panel 18 via the chassis 48 of first housing member 14. Posts (which may comprise rolls, bearings, etc.) 62, 64 positioned within first housing member 14 may guide movement of tensioners 60, 61 and ensure that ends 20, 21 of display panel 18 are pulled toward one another (e.g., in a direction that is perpendicular to the axis 45 of slider 40) as slider 40 is moved along axis 45.

As best shown in FIG. 7 (and particularly the progression from FIG. 6 to FIG. 7), as the tension in the tensioners 60, 61 (FIGS. 5 and 6) is increased, the ends 20, 21 of display panel 18 are pulled toward one another. The cross-sectional shape of the blocks 70, and particularly the angled sidewalls 73 allow the blocks 70 to individually rotate relative to one another to allow side portions 24, 26 of display panel 18 to curve toward front side 31 (and away form back side 33) relative to planar portion 22. In some examples, adjacent blocks 70 may be coupled to one another via hinge mechanisms (e.g., pinned connections) to facilitate the above-described rotation of blocks 70 resulting from increased tension in the tensioners 60, 61. Thus, during operations, the tensioners 60, 61 are to pull the ends 20, 21 of display panel 18 toward one another so as to induce the concave curvature in the display panel 18 when in the curved position (FIG. 2).

Referring now to FIG. 8, a biasing assembly 80 may be coupled to the rows 76, 77 of the blocks 70 below each side portion 24, 26 of the display panel 18 (FIGS. 1 and 2). The biasing assemblies 80 may bias display panel 18 toward the flat position of FIG. 1. In particular, biasing assembly 80 may comprise a plurality of biasing members 82 positioned between rows 76, 77. In some examples, biasing members 82 may comprise flat springs (e.g., spring plates) that may bias angled sidewalls 73 of blocks 70 away from one another so as to rotate blocks 70 in a direction opposite the direction of the tension exerted by tensioners 60, 61.

Referring again to FIGS. 4 and 5, a locking mechanism 50 may be coupled to the slider 40 that is to maintain a position of the slider 40 against the bias exerted by the biasing members 82 of biasing assembly 80 (FIG. 8) and the tension within tensioners 60, 61. In some examples, locking mechanism 50 comprises a plurality of first teeth 52 coupled to slider 40 and in particular coupled to the first body 42 of slider 40. In addition, a pair of second teeth 54 are coupled within first housing member 14 that are biased into engagement with the plurality of first teeth 52 via a pair of biasing assemblies 56. The biasing assemblies 56 may each comprise a suitable spring mechanism (e.g., torsional spring, flat spring, etc.) that is coupled to the second teeth 54 and to supporting structure 58 within or of first housing member 14.

During operations, the biased engagement of second teeth 54 with the plurality of first teeth 52 (e.g., via biasing assemblies 56) is sufficient to prevent movement of the slider 40 due to the bias provided by the biasing assembly 80 and/or the tension exerted on slider 40 by tensioners 60, 61. Thus, the biasing assemblies 56 may be said to resist the movement of the slider 40 during operations (e.g., via the engagement of teeth 52, 54). Accordingly, when a user moves the slider 40 to a particular position (e.g., to achieve the flat position of FIG. 1, the curved position of FIG. 2, or a position therebetween), the engagement between the teeth 52, 54 (e.g., via biasing assemblies 56) may maintain the selected position of the slider 40 after the user disengages the first body 42. The additional force imparted on the first body 42 of slider 40 by a user may allow the second teeth 54 to disengage from between corresponding first teeth 52 on first body 42 so as to allow movement of the slider 40 on first housing member 14.

The examples disclosed herein include electronic devices having a display panel that may be selectively transitioned between a flat position and a curved position. Thus, through use of the examples disclosed herein, a user may obtain the visual benefits of a curved display panel while ensuring the collapsibility and transportability of the electronic device.

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the discussion above and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As used herein, including in the claims, the word "or" is used in an inclusive manner. For example, "A or B" means any of the following: "A" alone, "B" alone, or both "A" and "B." In addition, when used herein including in the claims, the word "generally" or "substantially" means within a range of plus or minus 10% of the stated value.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An electronic device, comprising:
a housing;
a display panel supported by the housing, wherein the display panel comprises:
a planar portion; and
a side portion extending from the planar portion to an end of the display panel, wherein the planar portion and the side portion are to display images, wherein the display panel is to transition between a first position in which the side portion is co-planar with the planar portion and a second position in which the side portion is curved relative to the planar portion:
a wire coupled to the end of the display panel, wherein the wire is to pull on the end of the display panel to transition the display panel from the first position to the second position;
a slider coupled to the housing, wherein movement of the slider is to increase a tension in the wire; and
a locking mechanism coupled to the slider that is to maintain a position of the slider against a bias exerted by a plurality of biasing members, wherein the locking mechanism comprises:
a plurality of first teeth coupled to the slider; and
a second tooth coupled to the housing that is biased into engagement with the plurality of first teeth.

2. The electronic device of claim 1, wherein the housing comprises a plurality of blocks positioned under the display panel, wherein each block of the plurality of blocks comprises a trapezoidal cross-section.

3. The electronic device of claim 1, wherein the housing comprises the plurality of biasing members that are to bias the side portion to the first position.

4. An electronic device, comprising:
a housing;
a display panel supported by the housing, wherein the display panel comprises a pair of ends and a display surface to display images;
a tensioner coupled to the pair of ends such that the tensioner is to pull the pair of ends toward one another to induce a concave curvature in the display surface;
a slider coupled to the tensioner, wherein the slider is to move along the housing to increase a tension in the tensioner; and
a locking mechanism coupled to the slider to maintain a position of the slider on the housing, wherein the locking mechanism comprises:
a plurality of first teeth coupled to the slider; and
a second tooth coupled to the housing that is biased into engagement with the plurality of first teeth.

5. The electronic device of claim 4, wherein the slider is positioned on an opposite side of the housing from the display surface.

6. The electronic device of claim 4, wherein the housing comprises a plurality of blocks positioned under the display panel, wherein each block of the plurality of blocks comprises a trapezoidal cross-section.

7. The electronic device of claim 6, wherein each block of the plurality of blocks comprises a channel to receive the tensioner.

8. An electronic device, comprising:
a housing including a first side and a second side opposite the first side;
a display panel supported by the housing, wherein a display surface of the display panel is visible on the first side of the housing;
a slider positioned on the second side of the housing, wherein the slider is to move along the second side of the housing to induce a concave curvature in the display surface; and a locking mechanism coupled to the slider to maintain a position of the slider on the second side of the housing, wherein the locking mechanism comprises:
a plurality of first teeth coupled to the slider; and
a second tooth coupled to the housing that is biased into engagement with the plurality of first teeth.

9. The electronic device of claim 8, comprising a wire coupled to an end of the display panel, wherein the slider is to engage with the wire to induce the concave curvature in the display surface.

10. The electronic device of claim 9, comprising a biasing member positioned within the housing to resist movement of the slider to induce the concave curvature in the display panel.

11. The electronic device of claim 8, wherein the housing comprises a plurality of blocks positioned under the display panel, wherein each block of the plurality of blocks comprises a trapezoidal cross-section.

\* \* \* \* \*